Figure 1:
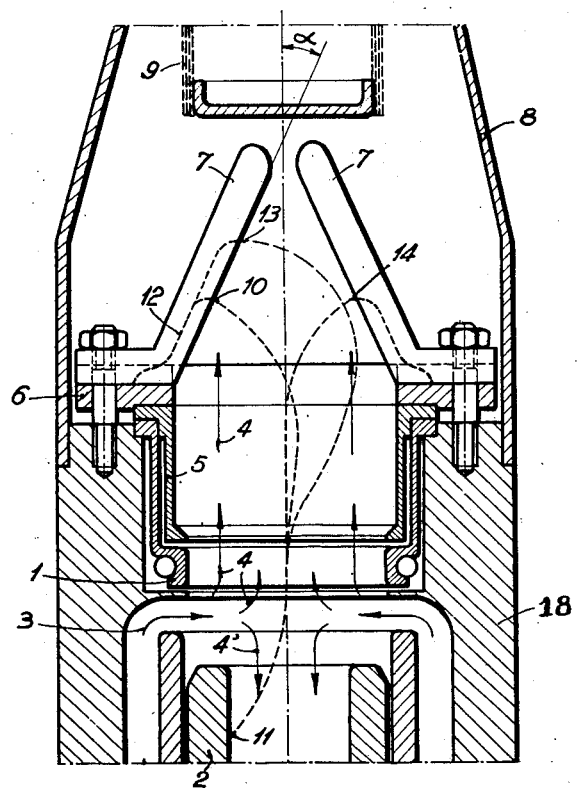

June 10, 1952     A. LATOUR     2,599,848
SPARK ARRESTER FOR PRESSURE GAS SWITCHES
Filed Jan. 23, 1947     3 Sheets-Sheet 1

June 10, 1952  A. LATOUR  2,599,848
SPARK ARRESTER FOR PRESSURE GAS SWITCHES
Filed Jan. 23, 1947  3 Sheets-Sheet 2

June 10, 1952  A. LATOUR  2,599,848
SPARK ARRESTER FOR PRESSURE GAS SWITCHES
Filed Jan. 23, 1947  3 Sheets-Sheet 3

Patented June 10, 1952

2,599,848

UNITED STATES PATENT OFFICE 2,599,848

SPARK ARRESTER FOR PRESSURE GAS SWITCHES

André Latour, Grenoble, France

Application January 23, 1947, Serial No. 723,725
In France May 30, 1942

Section 1, Public Law 690, August 8, 1946
Patent expires May 30, 1962

4 Claims. (Cl. 200—148)

This invention relates to electric pressure gas switches of the blast type comprising a nozzle-like fixed electrode through which the gas blast flows and a movable contact adapted to move away from said nozzle-like contact in a direction opposed to the flow of said gas blast.

It is known to dispose downstream one or more auxiliary electrodes on which the root of the arc is transferred.

Such electrodes are not without objections. In particular, as they possess no means for displacing the root of the arc along their own surface and that they are located in the hottest area of the gaseous discharge which strikes at least one point of their surface almost perpendicularly thereto, there results the production of hot spots which, even when the electrodes are made of refractory material, cause their rapid deterioration by fusion and volatilisation. This destruction of metal is further accompanied by a heavy and rough release of metallic vapours which give rise to counter pressures which are extremely objectionable to the good working of the breaking device.

According to the invention, all these inconveniences are overcome and at the same time a much more efficient action of the said spark arresters is obtained in that they are formed and that the entry of current is arranged in such a manner that they exert on the arc an electro-dynamic action by which the root of the latter is forced to continually move not only in passing along the surface of each electrode but again in jumping from one electrode to the other. In addition, also, according to the invention, the speed of this displacement is also accelerated by disposing the active surface of the electrodes in such a manner that the compressed gas current acts in the same direction as the electro-dynamic force. Finally the heating of the electrodes caused by the shock of the molecules of incandescent gas is considerably reduced by giving to their surface a convenient inclined position to the direction of the gaseous current, in particular such a position that there shall exist, in the region where the gaseous current strikes, no elementary portion of the said surface in which the plane is normal to the said direction of gaseous current.

The place where the current penetrates into the body of the spark arrester is chosen in such a manner that the streams of current passing into the spark arrester, form with the body of the arc, a loop as accentuated as possible.

The drawing shows, by way of example, some possible forms of construction of the invention which therefore are not limitative and admit of still other forms of construction.

Figure 2:
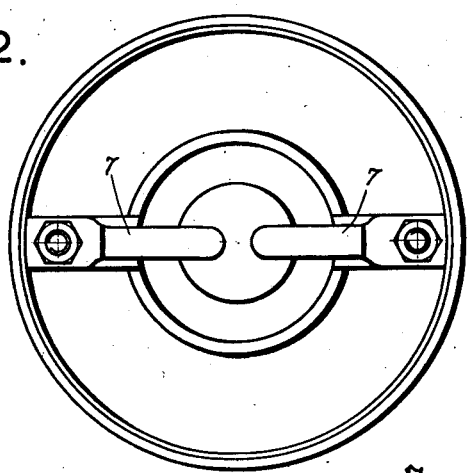
Figure 3:
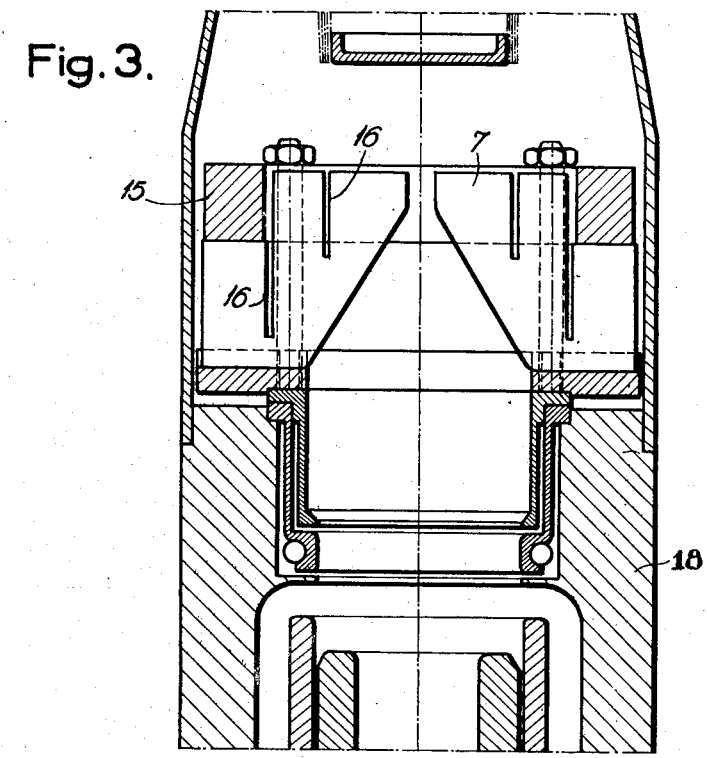
Figure 4:
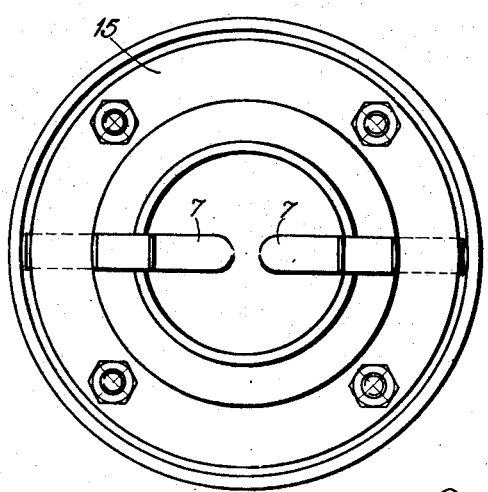
Figure 5:
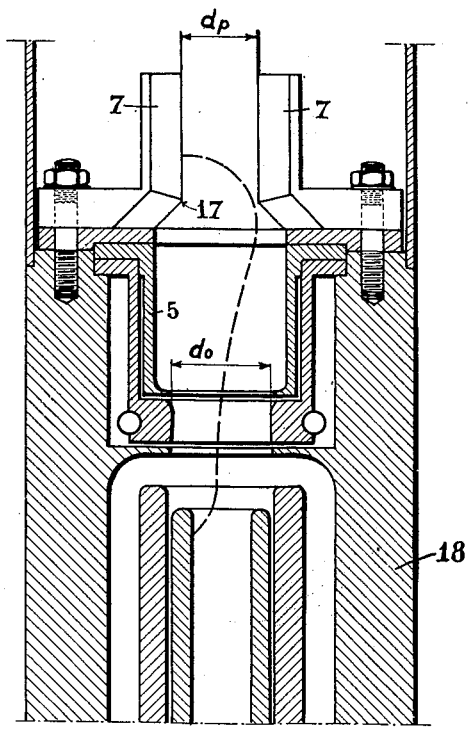

It shows:

Fig. 1 a device according to the invention in longitudinal section; Fig. 2 the same in plan view; Fig. 3 another form of construction in longitudinal section; Fig. 4 a corresponding plan view; Fig. 5, another construction in longitudinal section, and Fig. 6 the same in plan view.

In the first embodiment shown in Figs. 1 and 2 a hollow stationary contact member 1 preferably designed as a nozzle is arranged with the axis thereof having a vertical position. A movable contact member 2 which is preferably hollow is adapted to make contact in one end position thereof with the stationary contact member 1 and to be moved away from the same at one side thereof, the open position of the contact member being shown in Fig. 1. The movable contact member is surrounded by an annular space through which a gas blast is discharged between the contact members so as to follow a path indicated by the arrows which consist of a radial part 3 and divides into an upper discharge current indicated by arrows 4 and passing through the stationary contact member 1 and the parts connected thereto to be described hereinafter, and a lower discharge current indicated by the arrow 4' and passing through the movable contact member 2. A hollow chimney-shaped conductive member or protection socket 5 is arranged above the stationary contact and electrically connected therewith. An annular bridge member 6 serves for fastening the upper rims of the stationary contact member 1 and the hollow conductive member 5 to each other and carries a pair of sparking electrodes or spark arresters 7. The whole may, if necessary be covered by an exhaust pot 8 provided or not with a cooling device for the gases and a noise silencer 9.

The spark arresters 7 are mounted in pairs in eccentric position relatively to the gaseous current and are opposite each other as seen in Figs. 1 and 2. They present an extended form, the longitudinal axis of which is placed obliquely in relation to the gaseous current making therewith an angle $a$ preferably less than or at most equal to 45°. Their extremity point in the same direction as the gaseous current flows. An outside casing member 18 encloses the portions of the switch except the spark arresters 7.

The operation is as follows:

At the moment where the movable contact 2 separates from the fixed contact 1, an arc is drawn the lower root of which, driven by the gaseous current 4' is engulfed at the interior of the movable contact 2 on the internal surface of which it oscillates without becoming fixed. The upper root, driven by the current 4, first slides along the internal wall of contact 1 then along the internal wall of the socket 5 and finally along the active surface of the spark arrester 7 on the left side. If it is observed at the moment when it reaches the position 10 it will be seen that the arc 10, 11 forms, due to the particular arrangement of the spark arrester, a loop with the resultant 12 of the streams of electric current traversing said spark arrester.

By reason of the well known electro-dynamic forces to which curved conductors are subjected, this loop tends to increase its surface which causes the root of the arc to take up the position 13. Step by step as this root comes near to the extremity of the spark arrester 7, the resultant 12 of the streams of current extends and the effect of repulsion exerted on the column of the arc increases. The latter is thus driven towards the spark arrester on the right hand side along the path indicated by the broken line 13, 11. Thereafter the arc has the possibility of taking a path of lesser resistance because shorter by starting a new root 14 on the spark arrester on the right hand side which causes the extinction of the branch 13, 14 and the disappearance of the root 13.

The same phenomenon occurs thus periodically during the whole existence of the arc until its final extinction by the breaking device.

The pendular movement thus obtained has an important consequence: In addition to the rapid displacement of the root of the arc at the surface of the spark arrester, thanks to which the production of localized hot spots, which generate undesirable metallic vapours is radically avoided, it will be noticed on the other hand that each spark arrester works alternatively and that whilst one becomes heated, the other one cools which is particularly advantageous for its good preservation and its slow wear.

It is likewise possible to limit the heating of the spark arresters by increasing their calorific inertia that is to say their mass. It is necessary, nevertheless, to take care not to increase their dimension in a direction such as to impede the flow of the gaseous current 4. To attain this object, it is advantageous to make them as plates placed transversally as shown in Fig. 3. A bridge 15 allows of fixing and rapid release of the spark arresters. In order to prevent the massive form to be an obstacle to the electro-dynamic forces, there may be provided one or more slots 16 which serve to localize the current in the neighbourhood of the active surface.

It is also possible to provide several pairs of spark arresters evenly distributed around the discharge orifice for the gases. Experience has shown in fact that at the separation of the contacts 1 and 2, the arc does not start always at the same place which permits the arc to fix its plane of oscillation on the pair nearest its starting point.

When there are several pairs of spark arresters, this plane of oscillation is not obligatorily the same for each break. It suffices, in fact, of an eddy or any other cause for the arc to adopt another pair of electrodes.

Figure 6:
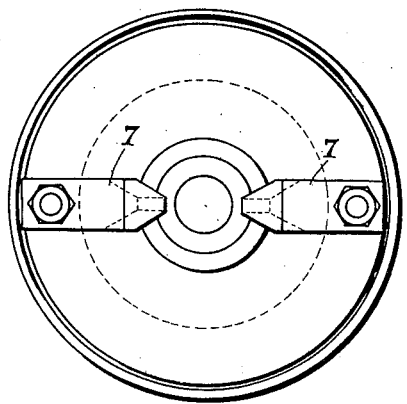

It may happen that there may be some difficulties in causing the arc to engage on the spark arresters. That is the case especially when for construction reasons it is necessary to leave a notable distance between the main contact and the spark arresters. It is then noticed that the latter do not play their essential part which is to protect the main contact. Figs. 5 and 6 show how, in this case, there is obtained nevertheless good results by favouring the engagement of the arc by an angular part 17 provided on the active face of the spark arrester. The latter will receive advantageously the form of a dulled knife edge preferably to a rounded form.

As shown in Fig. 5 the angle $a$ shown in Fig. 1 can be nil at the free end of the electrodes 7 and the active surface of the spark arrester is then parallel to the gaseous jet.

The distance $dp$ which separates the spark arresters of a same pair will be chosen in terms of the diameter $do$ of the annular contact and preferably in such a manner that the active surface is situated in the peripheral region of the gaseous jet. Good results, for instance, are obtained by taking a distance $dp$ equal to half the diameter of the orifice of the annular contact.

The figures show the arrangement applied to a particular type of switch of compressed gas type but it is clear that the invention has an absolutely general character and is applicable to all switches in which it is necessary to obtain the extinction of the arc with the use of blowing either at the interior or the exterior of a nozzle, a tube or a break chamber.

What I claim is:

1. In an electric circuit breaker of the gas blast type, in combination, a hollow stationary contact member; a movable contact member adapted to make contact in one end position thereof with said stationary contact member and to be moved away from the same at one side thereof so as to form an electric arc between said contact members; a hollow conductive member arranged on the opposite side of said stationary contact member and electrically connected therewith; means for establishing a gas blast through said stationary contact member and said conductive member; and a pair of sparking electrodes arranged oppositely to each other in electrical contact with, and outside of, said conductive member and protruding into the paths of the gas blast, whereby the arc formed between said contact members is transferred with one root thereof from said stationary contact member over said conductive member to said sparking electrodes whereby the tendency of the arc to form a bulge in the space limited by said conductive member and said electrodes causes the transfer of the root alternately from one of said sparking electrodes to the other.

2. In an electric circuit breaker of the gas blast type, in combination, a nozzle-shaped stationary contact member; a movable contact member adapted to make contact in one end position thereof with said stationary contact member and to be moved away from the same at one side thereof so as to form an electric arc between said contact members; a chimney-shaped conductive member arranged within said nozzle-shaped stationary contact member and electrically connected therewith; means for establishing a gas blast through said stationary contact member and said conductive member; and a pair of sparking electrodes arranged oppositely to each other in electrical contact with, and outside of, said chimney-shaped conductive member and protruding into the paths of the gas blast, whereby the arc formed between said contact members is transferred with one root thereof from said stationary contact member over said conductive member to said sparking electrodes whereby the tendency of the arc to form a bulge in the space limited by said conductive member and said electrodes causes the transfer of the root alternately from one of said sparking electrodes to the other.

3. In an electric circuit breaker of the gas blast type, in combination, a nozzle-shaped stationary contact member; a movable contact member adapted to make contact in one end position thereof with said stationary contact member and to be moved away from the same at one side thereof so as to form an electric arc between said contact members; a chimney-shaped conductive member arranged within said nozzle-shaped stationary contact member and electrically connected therewith; means for establishing a gas blast through said stationary contact member and said conductive member; and a pair of sparking electrodes arranged oppositely to each other in electrical contact with, and outside of, said chimney-shaped conductive member and protruding into the paths of the gas blast and including an acute angle with the axis of said nozzle-shaped stationary contact member, whereby the arc formed between said contact members is transferred with one root thereof from said stationary contact member over said conductive member to said sparking electrodes whereby the tendency of the arc to form a bulge in the space limited by said conductive member and said electrodes causes the transfer of the root alternately from one of said sparking electrodes to the other.

4. In an electric circuit breaker of the gas blast type, in combination, a nozzle-shaped stationary contact member; a movable contact member adapted to make contact in one end position thereof with said stationary contact member and to be moved away from the same at one side thereof so as to form an electric arc between said contact members; a chimney-shaped conductive member arranged within said nozzle-shaped stationary contact member and electrically connected therewith; means for establishing a gas blast through said stationary contact member and said conductive member; and a pair of sparking electrodes arranged oppositely to each other in electrical contact with, and outside of, said chimney-shaped conductive member and protruding into the paths of the gas blast, said electrodes having an active portion parallel to the direction of the gas blast through said conductive member, said electrodes having a minimal distance from each other amounting to a fraction of the diameter of said nozzle-shaped stationary contact member, whereby the arc formed between said contact members is transferred with one root thereof from said stationary contact member over said conductive member to said sparking electrodes whereby the tendency of the arc to form a bulge in the space limited by said conductive member and said electrodes causes the transfer of the root alternately from one of said sparking electrodes to the other.

ANDRÉ LATOUR.

REFERENCES CITED

The following references are of record in the file of this patent:

UNITED STATES PATENTS

| Number | Name | Date |
|---|---|---|
| 1,898,901 | Ruppel | Feb. 21, 1933 |
| 1,961,475 | Clerc | June 5, 1934 |
| 1,982,134 | Clerc | Nov. 27, 1934 |
| 2,302,592 | Amer | Nov. 17, 1942 |
| 2,391,759 | Wilcox | Dec. 25, 1945 |
| 2,416,466 | Bruhlmann | Feb. 25, 1947 |

FOREIGN PATENTS

| Number | Country | Date |
|---|---|---|
| 302,603 | Great Britain | Apr. 17, 1930 |
| 569,075 | Germany | Jan. 31, 1933 |
| 852,580 | France | Oct. 30, 1939 |